United States Patent
Satou et al.

(10) Patent No.: US 6,904,944 B2
(45) Date of Patent: Jun. 14, 2005

(54) FUEL FILLING DEVICE AND FUEL LEAKAGE DETECTION METHOD

(75) Inventors: Kazutoshi Satou, Kawasaki (JP); Naoyuki Takano, Kawasaki (JP); Yoshikazu Shirane, Yokohama (JP); Kunihiko Gotou, Tokyo (JP); Koji Matsumoto, Tokyo (JP)

(73) Assignees: Nitto Kohki Co., Ltd., Tokyo (JP); Taiyo Nippon Sanso Corporation, Tokyo (JP)

( * ) Notice: Subject to any disclaimer, the term of this patent is extended or adjusted under 35 U.S.C. 154(b) by 115 days.

(21) Appl. No.: 10/384,365

(22) Filed: Mar. 7, 2003

(65) Prior Publication Data
US 2003/0209282 A1 Nov. 13, 2003

(30) Foreign Application Priority Data

Mar. 13, 2002 (JP) .................................. P2002-069086
Feb. 19, 2003 (JP) .................................. P2003-041014

(51) Int. Cl.$^7$ ............................................. B65B 31/00
(52) U.S. Cl. ................................. 141/100; 141/59
(58) Field of Search ............................ 141/86, 311 A, 141/93, 45, 59, 286, 285, 2–4, 18, 197

(56) References Cited

U.S. PATENT DOCUMENTS 3,860,742 A * 1/1975 Medney .................... 174/84 S
5,201,493 A * 4/1993 Kim ....................... 251/315.05
6,152,191 A * 11/2000 Chan et al. .................. 141/18
6,401,767 B1 * 6/2002 Cohen et al. .................. 141/1
6,442,012 B2 * 8/2002 Koike et al. ................ 361/212

FOREIGN PATENT DOCUMENTS

JP  2000074009 A  *  3/2000
JP  2000104746 A  *  4/2000

OTHER PUBLICATIONS

Japan Gas Association, "Safety and Technical Guidelines for Compressed Natural Gas Stations", Apr. 1998, pp. 44.

* cited by examiner

Primary Examiner—Khoa D. Huynh
(74) Attorney, Agent, or Firm—Darby & Darby

(57) ABSTRACT

A fuel filling device is provided with a fuel supply adjusting section which adjusts the amount of fuel supplied, a fuel feed line which feeds fuel from a fuel supply adjusting section to a vehicle W, a nozzle removably coupled to vehicle W that supplies fuel from fuel feed line to vehicle W, and a discharge device that discharges fuel present within fuel feed line to the outside to prevent deterioration of packings used in the device in the case of filling a fuel at high pressure, while also facilitate the operation of a filling nozzle.

9 Claims, 6 Drawing Sheets

FUEL FILLING DEVICE AND FUEL LEAKAGE DETECTION METHOD

BACKGROUND OF THE INVENTION

1. Field of the Invention

The present invention relates to a fuel filling device that fills hydrogen or compressed natural gas as fuel into a vehicle, and to a method of detecting fuel leakage of a fuel filling device.

2. Description of Related Art

Development is proceeding on hydrogen automobiles and compressed natural gas automobiles using hydrogen gas and compressed natural gas for fuel as next-generation automobiles. These automobiles are characterized by low emission levels of carbon dioxide gas, NOx, SOx, and other pollutants.

When refueling these automobiles, the automobiles are driven to a refueling station provided with a fuel filling device (dispenser) that fills the hydrogen gas or compressed natural gas used as fuel, and fuel is then replenished at that refueling station in the same manner as current gasoline-fueled automobiles.

Studies are being conducted on the safety and other aspects of these automobiles and fuel filling devices (refer to, for example, Japan Gas Association, "Safety and Technical Guidelines for Compressed Natural Gas Stations", April 1998, p. 44).

In the case of using compressed natural gas as fuel, underground supply pipes that supply compressed natural gas to homes and corporations are used in fuel filling devices. Compressed natural gas that has been supplied through a pipe that branches from a supply pipe used to feed compressed natural gas to homes and corporations is boosted in pressure with a compressor, and this compressed natural gas is then supplied to a plurality of storage tanks at respectively different filling pressures followed by maintenance and management of that supply.

In the case of filling compressed natural gas into the fuel tank of an automobile, compressed natural gas is begun to be supplied by removing compressed natural gas from one of the plurality of storage tanks at a low filling pressure, and then the pressure of the automobile fuel tank approaches the pressure of the storage tank, the supply path switches to another storage tank having a higher filling pressure than this storage tank.

In this manner, by supplying compressed natural gas from a tank while sequentially switching to a storage tank filled at a higher filling pressure, filling is carried out so as not to cause rapid filling accompanying sudden changes in pressure.

The maximum filling pressure of storage tanks in conventional compressed natural gas fuel filling equipment is about 25 MPa.

In the case of using hydrogen gas for fuel, a method in which hydrogen gas is generated by primarily reacting natural gas and water at a high temperature of 700–800° C., and a method in which hydrogen gas is generated by electrolysis of water, are being considered.

The hydrogen gas generated with these methods is boosted in pressure by a diaphragm-type pressure booster, and then filled into a plurality of storage tanks at respectively different pressures followed by maintenance and management of that supply.

During filling of fuel, similar to the case of compressed natural gas, filling is carried out by removing fuel while sequentially switching the plurality of fuel tanks among low pressure, intermediate pressure and high pressure tanks so as to prevent the occurrence of rapid filling.

The maximum pressure of hydrogen gas fuel storage tanks in current prototype equipment is about 40 MPa.

FIG. 5 shows an example of a fuel filling device that fills hydrogen gas or compressed natural gas into the fuel tank of an automobile.

This fuel filling device 50 is provided with a fuel supply adjusting section 51 that adjusts the amount of fuel supplied, a filling hose 61 coupled thereto that feeds fuel to a fuel tank T of an automobile W, a nozzle 65 arranged on the end section of the filling hose 61 that supplies fuel by being removably coupled to a line 73 running to fuel tank T of automobile W, and a discharge hose 70, one end of which is coupled to nozzle 65, while the other end is open to the atmosphere via a valve 69 after passing through fuel supply adjusting section 51.

A fuel distribution line 52 that sends fuel from a fuel source 60 to filling hose 61 is provided in fuel supply adjusting section 51.

A mass flow meter 53, a flow rate adjusting valve 54, a cutoff valve 55, and a pressure switch 56 are provided in fuel distribution line 52.

Fuel source 60 is composed of a plurality of storage tanks 60k, 60m, and 60n into which fuel has been filled at mutually different pressures, namely a low pressure, an intermediate pressure and a high pressure, and these storage tanks 60k, 60m, and 60n are switchably connected to fuel distribution line 52.

Nozzle 65 is a three-way valve, filling hose 61 is connected to connection port 65a of connection ports 65a through 65c, and discharge hose 70 is connected to connection port 65b. The remaining connection port 65c is located at a filling port 66, and filling port 66 is able to be removably connected to a receptacle 71 serving as the connection port of fuel tank T of automobile W in a single operation by means of a pipe coupling structure.

To prevent the fuel filling device from being damaged or the fuel from leaking when filling hose 61 and discharge hose 70 are subjected to a predetermined tensile force or greater due to automobile W mistakenly being driven away in the state in which filling hose 61 and discharge hose 70 are still connected, or due to being subjected to an external impact, an emergency release pipe coupling 62 is provided at an intermediate location of filling hose 61 and discharge hose 70 that is provided with a cutoff function, which together with releasing when acted on by a prescribed tensile force, prevents outside air from entering the hose.

In fuel filling device 50, filling operation is performed with the series of operations described below.

In the standby state, the connection port 65a with filling hose 61 of nozzle 65 of fuel filling device 50 is closed, and connection port 65c on the side of automobile W and connection port 65b on the side of discharge hose 70 are connected.

When filling automobile W with fuel, nozzle 65 is connected so that its filling port 66 engages with receptacle 71 of automobile W.

Next, after a handle 65d of nozzle 65 is operated so as to connect filling hose 61 and receptacle 71 of automobile W by connecting connection port 65a and connection port 65c, fuel is filled from fuel source 60 into fuel tank T of automobile W by pressing a filling start button (not shown) arranged on fuel supply adjusting section 51 of fuel filling device 50.

Fuel is then filled into fuel tank T of automobile W through filling hose 61, nozzle connection ports 65a and 65c, and receptacle 71 from fuel supply adjusting section 51.

During filling, the storage tank among storage tanks 60k, 60m and 60n having a filling pressure which is higher than the pressure of fuel tank T of automobile W at the start of filling while also being the closest to the pressure of fuel tank T. At the same time, cutoff valve 55 is opened and discharge valve 69 is closed.

Together with then suitably adjusting the opening of flow rate adjusting valve 54 by controlling the drive air supplied to flow rate adjusting valve 54 by a control section 68 based on the pressure difference between the pressure of fuel distribution line 52 detected by pressure switch 56 and the storage tank pressure detected by pressure switch 67, filling is carried out by sequentially increasing the filling pressure in a stepwise manner so as to switch to the storage tank having next highest filling supply pressure when the pressure difference between the pressure of filling hose 61 and the pressure of the storage tank becomes smaller.

When the fuel is filled to a prescribed pressure value, and the value detected by pressure switch 56 reaches a prescribed pressure, pressure switch 56 emits a signal via control section 68 that causes a lamp and so forth to light (not shown) to inform that filling is completed, while at the same time, cutoff valve 55 closes and discharge valve 69 opens.

When filling is completed, the connection ports of nozzle 65 are switched by handle 65d. Namely, connection port 65c and connection port 65b are made to be connected.

In this manner, when the connections ports of nozzle 65 are switched by operating handle 65d so that nozzle connection port 65c on the side of receptacle 71 and connection port 65b leading to discharge hose 70 are made to be connected, fuel retained in line 73 running between nozzle 65 and cutoff valve 74 of fuel tank T of automobile W is discharged into the atmosphere via discharge hose 70.

Next, fuel filling operation is completed by disconnecting nozzle 65 from receptacle 71.

Since nozzle 65 is a three-way valve, the direction in which the connection ports are connected can be confirmed from the direction of handle 65d.

FIG. 6 shows the changes in pressure of filling hose 61 and discharge hose 70 during the filling operation process of this fuel filling device 50.

During standby, the pressure of filling hose 61 maintains a pressure equivalent to filling pressure PF of fuel tank T, and at the start of filling, rapidly drops to the pressure of the coupled storage tank, increases to a desired pressure by sequentially switching to a storage tank of the next highest pressure, and then reaches a standby state at a final filling pressure PF at completion of filling.

On the other hand, although the pressure inside discharge hose 70 increases in order to discharge high-pressure fuel remaining at completion of filling to the atmosphere at the start of the standby period, it is nearly at atmospheric pressure during the other steps.

In the case of a conventional fuel filling device 50, fuel from the previous refueling is retained in filling holes 61 when in a standby state in which fuel is not being filled into automobile W.

Hydrogen is a gas that has the potential to explode in the presence of an ignition source at a concentration of 4.0–75.0% in air. In addition, methane, which is the main component of compressed natural gas, is a gas that has the potential to explode in the presence of an ignition source at a concentration of 5.3–14.0% in air.

Consequently, it is not desirable to allow these gases to be retained within hoses and other lines.

At the current filling pressure at which fuel is filled into an automobile fuel tank T, the distance capable of being traveled by the automobile on a single refueling is about 200 km.

Although this traveling distance is determined by the capacity of the fuel tank T installed on the automobile W and its filling pressure, since there are limitations on the degree to which the capacity of fuel tank T installed on automobile W can be increased, in order to extend the traveling distance beyond 200 km, it is necessary to increase the pressure at which fuel is filled into fuel tank T, and higher filling pressures are desired such as increasing filling pressure from the current level of 40 MPa to 100 MPa.

However, in the case of filling device 50 of the prior art, when the filling pressure is increased, residual fuel remains at a high pressure within filling hose 61 or other lines during the standby state.

If fuel is allowed to be retained in the lines at this high pressure, fuel may permeate into the packings used in component machinery due to penetration, and this permeated fuel may cause deterioration of the packings as a result of swelling inside the packings when pressure drops at the start of filling.

Since hydrogen gas in particularly is highly penetrable with respect to the packings due to its small molecules, allowing hydrogen to be retained in the lines was undesirable.

In addition, in the case fuel is allowed to be retained in the lines in a high pressure state, since the inside of nozzle 65 reaches a high pressure, the pressing force of the packing against the surface inside nozzle 65 that contacts the packing becomes higher, resulting in the problem of it being difficult to open and close the valve of nozzle 65, while also making it difficult to attach and release nozzle 65 to and from automobile W.

In view of the above problems, an object of the present invention is to provide a fuel filling device capable of preventing deterioration of packings of the device in the case of filling fuel at a high pressure, and capable of facilitating operation of a filling nozzle.

BRIEF SUMMARY OF THE INVENTION

A fuel filling device according to the present invention is provided with a fuel supply adjusting section which adjusts the amount of fuel supplied, a fuel feed line which feeds fuel from the fuel supply adjusting section to a vehicle, a nozzle removably coupled to the vehicle which supplies fuel from the fuel feed line to the vehicle, and a discharge device which discharges fuel within the fuel feed line to the outside.

In the fuel filling device according to the present invention, preferably, the fuel supply adjusting section is provided with a fuel distribution line which guides the fuel to the fuel feed line, and the discharge device is connected to the fuel distribution line.

A packing used for the fuel supply adjusting section, fuel feed line, or nozzle is preferably composed of one or two or more selected from the group consisting of acrylonitrile butadiene rubber, hydrogenated acrylonitrile butadiene rubber, ethylene propylene rubber, fluorine rubber, polyacetal, and polyamide.

The packing used for the fuel supply adjusting section, fuel feed line, or nozzle is particularly preferably composed of one or two or more selected from the group consisting of acrylonitrile butadiene rubber, ethylene propylene rubber, and polyamide.

In the fuel filling device according to the present invention, preferably, the fuel feed line and fuel supply adjusting section are coupled with an electrically conductive member, and the fuel supply adjusting section is grounded.

In the fuel filling device according to the present invention, preferably, a flow meter which measures the flow rate of the fuel and a flow rate adjusting valve which adjusts the flow rate of the fuel are provided in the fuel supply adjusting section, thereby enabling a theoretical filling volume, which is calculated based on the flow rate of the fuel calculated from the opening of the flow rate adjusting valve and the pressure difference between the upstream pressure and downstream pressure of the flow rate adjusting valve, to be compared with the actual filling volume detected with the flow meter.

A method of detecting fuel leakage of a fuel filling device according to the present invention comprises: a fuel filling device being provided with a fuel supply adjusting section which adjusts the amount of fuel supplied, and the fuel supply adjusting section being provided with a flow meter which measures a flow rate of the fuel, and a flow rate adjusting valve which adjusts a flow rate of the fuel; wherein fuel leakage is detected by comparing a theoretical filling volume calculated based on an opening of the flow rate adjusting valve and a pressure difference between an upstream pressure and downstream pressure of the flow rate adjusting valve, and an actual filling volume detected with the flow meter.

Since the fuel filling device of the present invention is provided with a discharge device that discharges fuel present in a fuel feed line to the outside, fuel present in the fuel feed line and the like can immediately be discharged after completion of fuel filling, allowing the fuel filling device to stand by in a state in which the pressure in the fuel feed line has decreased to nearly atmospheric pressure.

Consequently, the packings used in each of the composite equipment that compose the fuel filling device can be prevented from being exposed to high-pressure fuel for a long period of time while in the standby state, and permeation of fuel into the packings can be prevented in advance.

Accordingly, deterioration of packings caused by permeation of fuel can be prevented, and fuel leakage and other accidents can be prevented.

In addition, since pressure inside a nozzle is at low pressure in the standby state, operations such as connection and release of the nozzle can be facilitated.

DETAILED DESCRIPTION OF THE INVENTION

An embodiment of the fuel filling device according to the present invention is explained with reference to FIG. 1.

Figure 1:
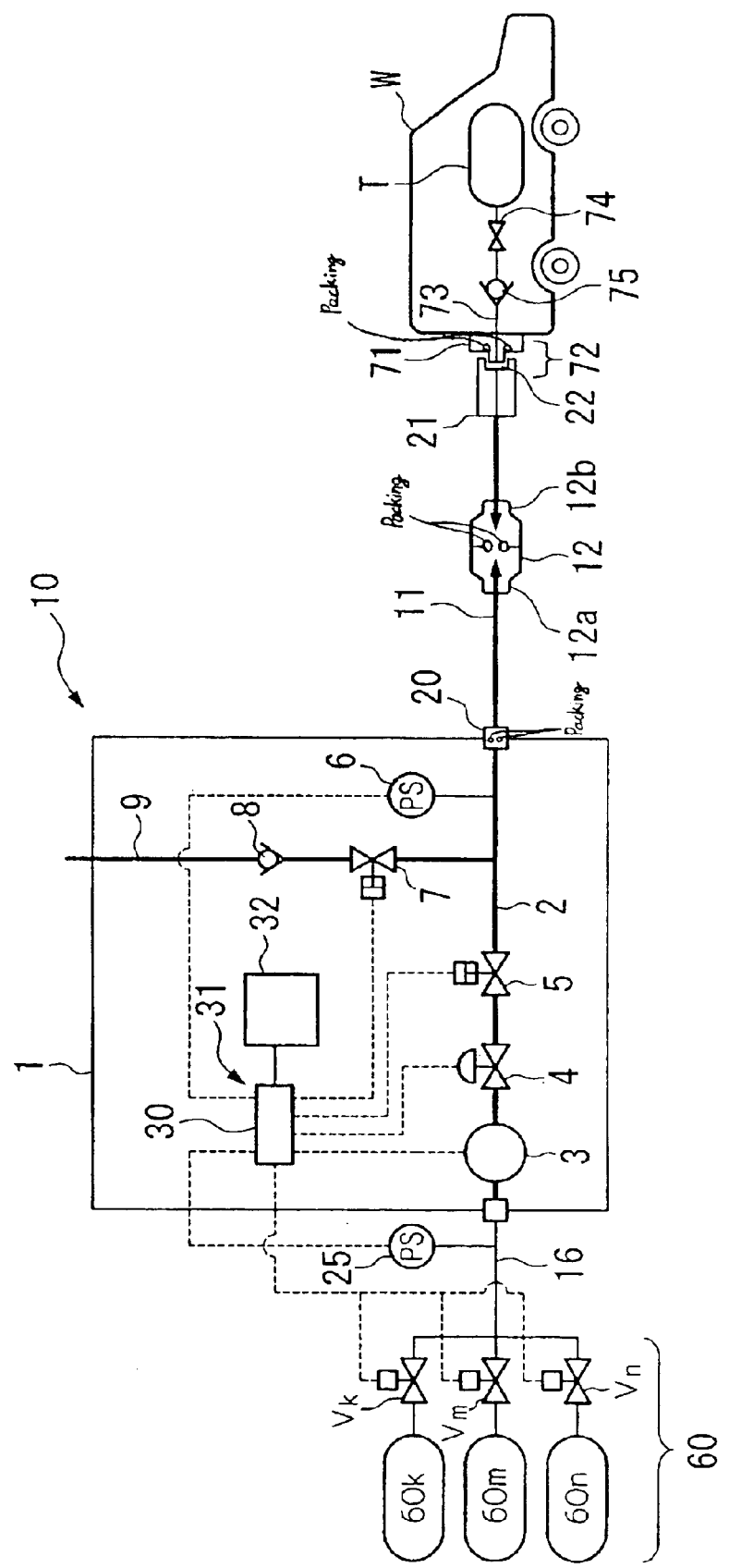
FIG. 1 is a schematic block diagram of one embodiment of a fuel filling device according to the present invention.

FIG. 1 is a schematic block diagram explaining one embodiment of the fuel filling device according to the present invention.

A fuel filling device 10 of the present embodiment is provided with a fuel supply adjusting section 1 which adjusts the amount of fuel supplied, a fuel feed line 11 which feeds fuel from fuel supply adjusting section 1 to an automobile W, a nozzle 21 arranged on the end section of the fuel feed line 11 which supplies fuel by being removably coupled to automobile W, and a discharge device in the form of a fuel discharge line 9 which discharges fuel within fuel feed line 11 to the outside.

A fuel distribution line 2 which feeds fuel from fuel source 60 to fuel feed line 11 is provided in fuel supply adjusting section 1. A mass flow meter 3, a flow rate adjusting valve 4, a cutoff valve 5, and a pressure switch 6 are provided in fuel distribution line 2.

Fuel source 60 is provided with a plurality of storage tanks 60k, 60m, and 60n in which fuel is filled at mutually different pressure, namely, a low, intermediate, and high pressure, respectively. Storage tanks 60k, 60m, and 60n are switchably connected to fuel distribution line 2 by valves VK, VM, and VN.

A pressure switch 25 is provided in line 16 which connects fuel source 60 and fuel distribution line 2.

Fuel discharge line 9 is provided with a cutoff valve 7 and a check valve 8, one end of which is connected to fuel distribution line 2 within fuel supply adjusting section 1, while the other end is open to the atmosphere.

Nozzle 21 is able to be removably connected to receptacle (connecting section) 71 of automobile W in a filling port 22 on the end of nozzle 21.

A pipe coupling structure 72 is preferably employed for nozzle 21 and receptacle 71 to block the entry of air when they are separated.

An emergency release pipe coupling 12 is provided in an intermediate section of fuel feed line 11.

Emergency release pipe coupling 12 is provided for preventing fuel filling device 1 from being damaged and fuel from leaking out when a predetermined tensile force or greater has acted on fuel feed line 11 due to automobile W mistakenly being driven away in the state in which fuel feed line 11 is still connected, or due to being subjected to an external impact.

Figure 2:
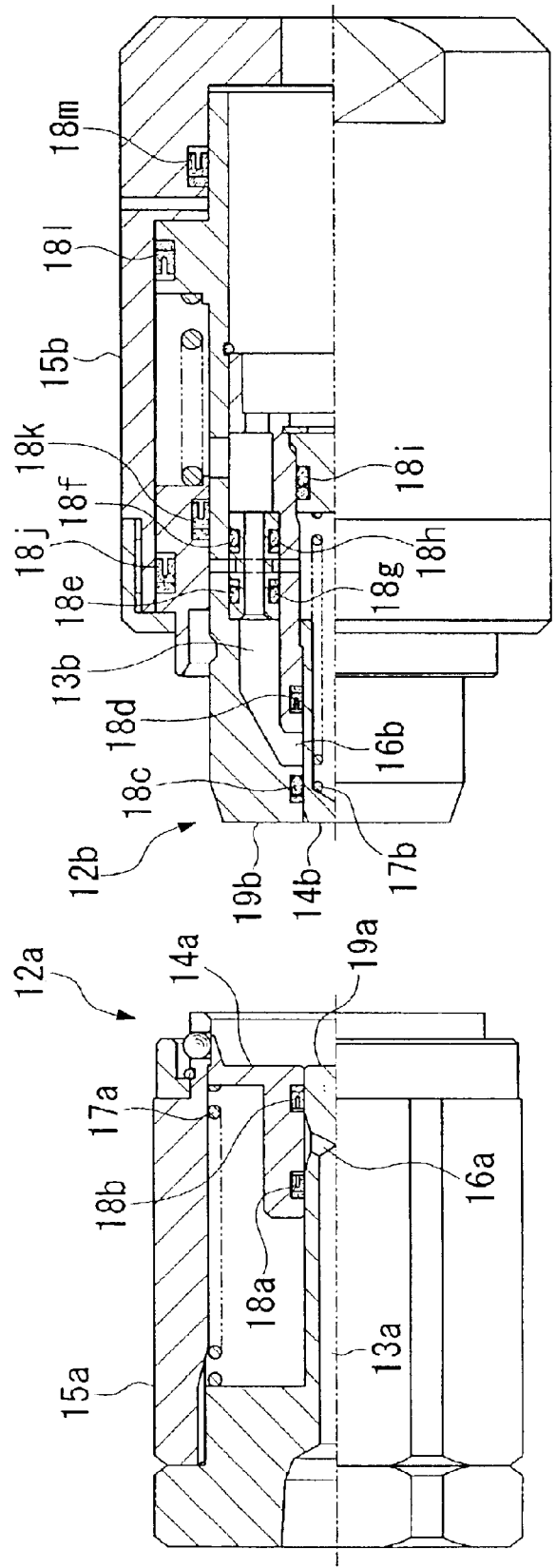
FIG. 2 is a partial cross-sectional view showing an emergency release pipe coupling that can be used in the fuel filling device shown in FIG. 1 in the state in which it has been released.

As shown in FIG. 2, emergency release pipe coupling 12 is provided with mutually removable upstream section 12a and downstream section 12b.

Upstream section 12a is provided with a main body 15a having a fuel distributing part 13a, and an upstream closing body 14a which closes an opening 16a of fuel distributing part 13a.

Downstream section 12b is provided with a main body 15b having a fuel distributing part 13b, and a downstream closing body 14b which closes an opening 16b of fuel distributing part 13b.

Closing bodies 14a and 14b are retractable, and are energized in the direction in which they approach each other (forward direction) by springs 17a and 17b.

Main body 15a of upstream section 12a is provided with a pushing section 19a which causes closing body 14b to move in the retracting direction, while main body 15b of downstream section 12b is provided with a pushing section 19b which causes closing body 14a to move in the retracting direction.

In emergency release pipe coupling 12, closing bodies 14a and 14b are each moved in the retracting direction in the state in which upstream section 12a and downstream section 12b are connected.

In the state in which closing bodies 14a and 14b have been moved in the retracting direction, openings 16a and 16b provided in main bodies 15a and 15b are open, and fuel passes through fuel distributing sections 13a and 13b.

When fuel flows through fuel distributing sections 13a and 13b while in this connected state, fuel contacts packings provided in emergency release pipe coupling 12.

Examples of packings which have the possibility of contacting fuel are indicated with reference symbols 18a through 18m.

Preferable examples of packings used in fuel supply adjusting section 1, fuel feed line 11, or nozzle 21 are composed of one or two or more selected from the group consisting of acrylonitrile butadiene rubber, hydrogenated acrylonitrile butadiene rubber, ethylene propylene rubber, fluorine rubber, polyacetal, and polyamide.

Particularly preferable examples of packings are composed of one or two or more selected from the group consisting of acrylonitrile butadiene rubber, ethylene propylene rubber, and polyamide.

These materials may applied to packings 18a through 18m of emergency release pipe coupling 12. In addition, they may also be used for the packings used in nozzle 21. They may also be used for the packings used in the parts composing fuel filling device 10 such as the pipe connections within fuel supply adjusting section 1.

The use of these materials makes it possible to prevent deterioration of the packings since it is difficult for fuel to permeate into the packings even if these materials contact with fuel in a high pressure state. Consequently, the sealing of, for example, fuel feed line 11 and nozzle 21 is maintained, and fuel leakage can be prevented for a long period of time.

Filling operation using fuel filling device 10 is explained as follows.

When filling fuel into automobile W, filling port 22 of nozzle 21 is connected to receptacle 71 of automobile W.

Next, together with flow rate adjusting valve 4 and cutoff valve 5 provided in fuel distribution line 2 being opened, cutoff valve 7 of fuel discharge line 9 is closed as a result of pressing a filling start button (not shown) installed in fuel supply adjusting section 1 of fuel filling device 10.

As a result, fuel from storage tanks 60k, 60m, and 60n enters automobile W by passing through fuel distribution line 2 and fuel feed line 11, and is filled into fuel tank T through line 73.

During filling of fuel, fuel is preferably maintained at a constant flow rate by suitably adjusting the opening of fuel flow adjusting valve 4 by controlling the drive air supplied to flow rate adjusting valve 4 by a control section 30 based on the pressure difference between the pressure of fuel distribution line 2 detected by pressure switch 6, and the storage tank pressure detected by pressure switch 25.

During filling of fuel, the storage tank among storage tanks 60k, 60m, and 60n is used which has a filling pressure that is higher than the pressure of fuel tank T of automobile W at the start of filling and which is also closest to fuel tank T.

When the pressure difference between the pressure of fuel feed line 11 detected by pressure switch 6 and the storage tank pressure of pressure switch 25 becomes small, valve Vk, Vm, and Vn are switched to so as to switch to the storage tank having the next highest filling pressure, and fuel is filled so that the filling pressure sequentially becomes higher in a stepwise manner.

When the fuel is filled into fuel tank T of automobile W to a prescribed pressure value, pressure switch 6 detects the prescribed pressure and emits a signal that causes a lamp and the like (not shown) to light in order to inform completion of filling. At the same time, cutoff valve 7 of fuel tank T of automobile W is closed.

In the case the pressure at which fuel is filled into fuel tank T is to be a high pressure (e.g., 50–100 MPa), the inside of fuel distribution line 2 and fuel feed line 11 reaches a high pressure (e.g., 50–100 MPa) during filling of fuel.

Next, together with valves Vk, Vm, and Vn of each storage tank of fuel source 60 as well as cutoff valve 5 being closed, cutoff valve 7 is opened by control section 30.

As a result, fuel retained in fuel feed line 11 is discharged into the atmosphere through fuel discharge line 9, and the pressure within fuel feed line 11 lowers to a value close to atmospheric pressure.

Next, nozzle 21 is removed from receptacle 71 and fuel filling operation is completed followed by waiting for an automobile to come when refueling is required.

In this standby state, the pressure within fuel distribution line 2 and fuel feed line 11 is maintained at a value close to atmospheric pressure.

Figure 3:
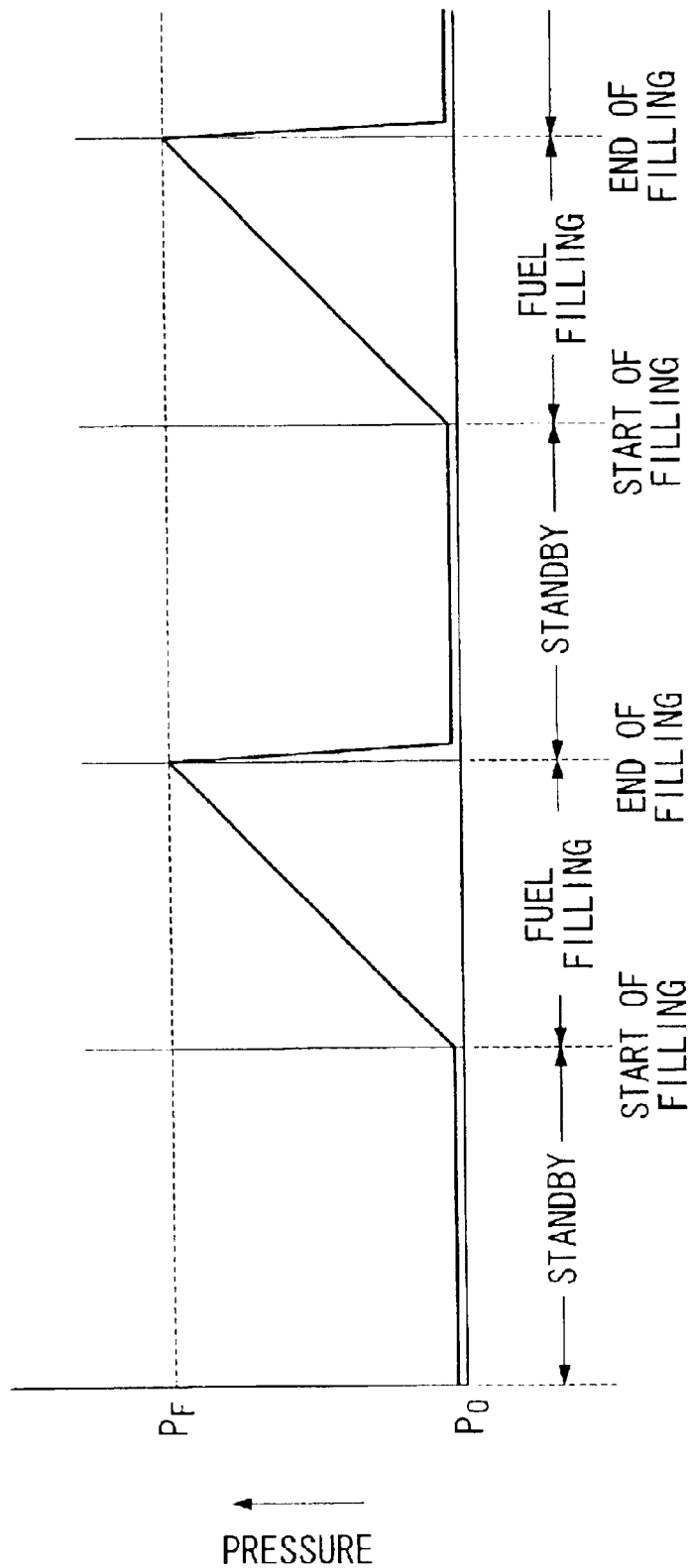
FIG. 3 is a graph showing the changes in pressure in a fuel feed line during fuel filling of the fuel filling device shown in FIG. 1.

The changes in pressure within fuel feed line 11 during filling operation of fuel filling device 10 are shown in FIG. 3.

As shown in FIG. 3, the pressure within fuel feed line 11 during standby is pressure P0 close to atmospheric pressure.

When filling is started, pressure P0 rises to the pressure of the connected storage tank, and as the storage tank is sequentially switched to storage tanks at a higher pressure, continues to rise to the pressure corresponding to the pressure of that storage tank, eventually rising to the desired filling pressure PF.

Together with completion of filling, since fuel within fuel feed line 11 is discharged into the atmosphere through fuel discharge line 9, the pressure within fuel feed line 11 drops to pressure P0 near atmospheric pressure followed by entering the standby state.

Subsequently, as standby and filling are repeated, the pressure within fuel feed line 11 repeatedly changes P0 (pressure during standby) to PF (pressure during filling) to P0 (pressure during standby) to PF (pressure during filling).

In fuel filling device 10 according to the present embodiment, since fuel discharge line 9 is provided that discharges fuel within fuel feed line 11 to the outside, fuel within fuel feed line 11 and the like can immediately be discharged from fuel discharge line 9 following completion of filling, and fuel filling device 10 is able to wait in a standby state in which the pressure within fuel feed line 11 has been lowered to nearly atmospheric pressure.

Consequently, the packings used for each of the composite equipment that compose fuel filling device 10 (such as packings 18a through 18m of emergency release pipe coupling 12) are prevented from being exposed to high-pressure fuel for long periods of time while in this state, thereby making it possible to prevent fuel from permeating into the packings.

Accordingly, deterioration of the packings caused by permeation by penetration of fuel can be prevented, and accidents involving leakage of fuel and the like can be prevented.

In addition, operation such as connection and release of nozzle 21 can also be facilitated since the pressure within nozzle 21 is at a low pressure while in this standby state.

In addition, as a result of providing check valve 8 in fuel discharge line 9, an inflow of air into fuel feed line 11 and the system connected thereto can be prevented even if the pressure following completion of filling drops suddenly, and the inside of the system can also be maintained at low pressure.

Consequently, the pressure change at completion of filling can be decreased, the resulting effects on the packings can be suppressed, and packing deterioration can be prevented.

In addition, as a result of installing check valve 8, the entry of atmospheric components into fuel tank T of automobile W can be prevented when fuel is filled into the next automobile W.

Moreover, since air remaining between filling port 22 of nozzle 21 and a check valve 75 arranged in fuel tank T of automobile W is not allowed to enter fuel tank T during filling of fuel, entrance of air can be reliably prevented by repeating pressurized filling and atmospheric discharge several times on paths in which air is present prior to filling fuel tank T.

The number of times of this operation should be determined each time according to the pressurized filling pressure and amount of atmospheric components allowed by automobile W. In addition, this operation of repeating pressurized filling and atmospheric discharge should be made to be performed simultaneous to pressing the start button (not shown).

In addition, the coupling sections of equipment made of metal materials that compose fuel filling device 10, and particularly those coupling sections in which insulated sealing tape is interposed between connecting members, are preferably grounded by coupling with a conductor while maintaining electrical conductivity.

Figure 4:
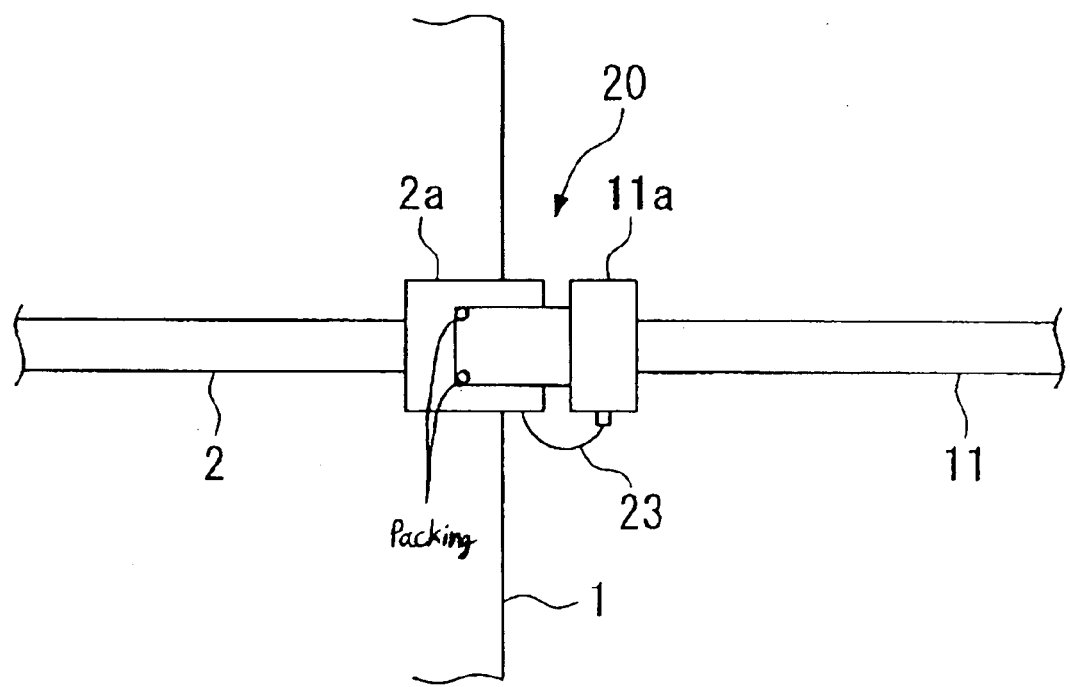
FIG. 4 is a schematic block diagram showing a coupled section between a fuel feed line and fuel distribution line in the fuel filling device shown in FIG. 1.
Figure 5:
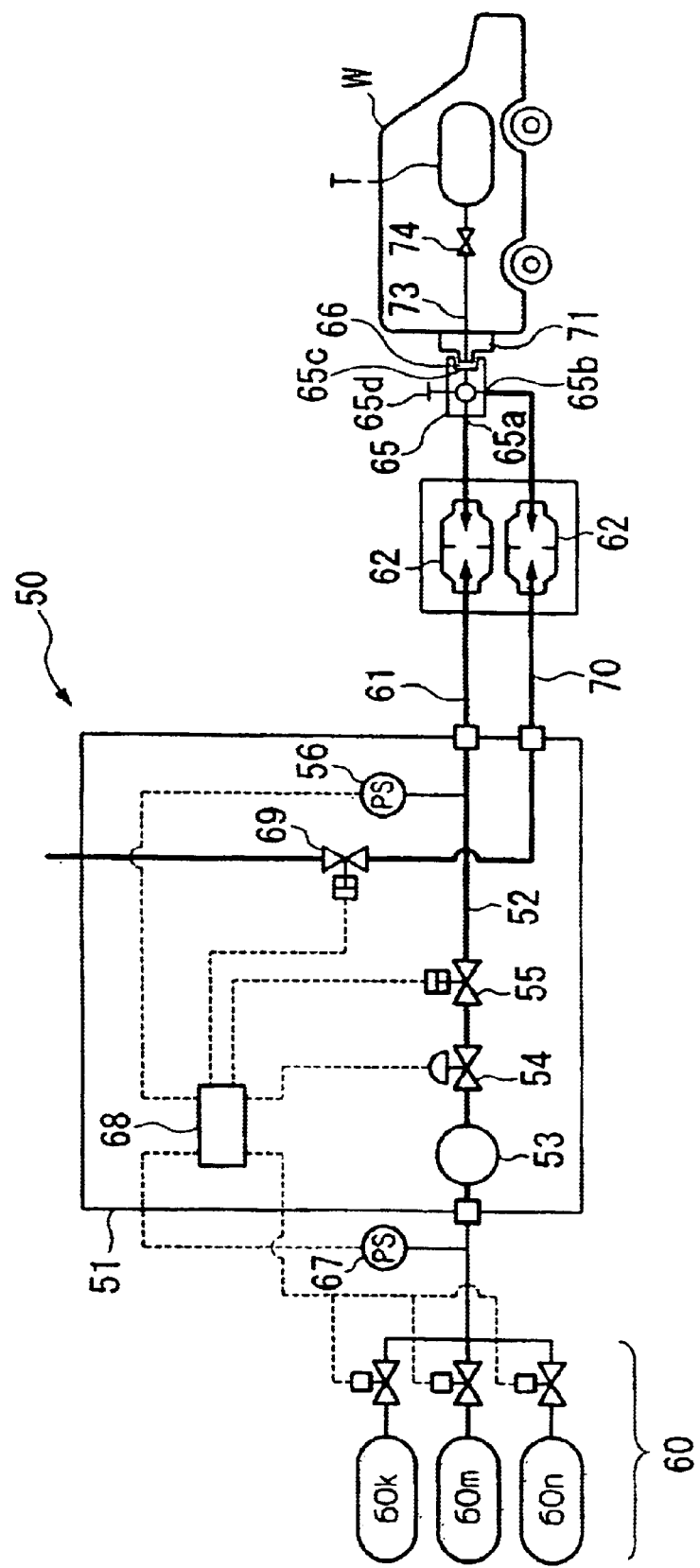
FIG. 5 is a schematic block diagram showing an example of a conventional fuel filling device.
Figure 6:
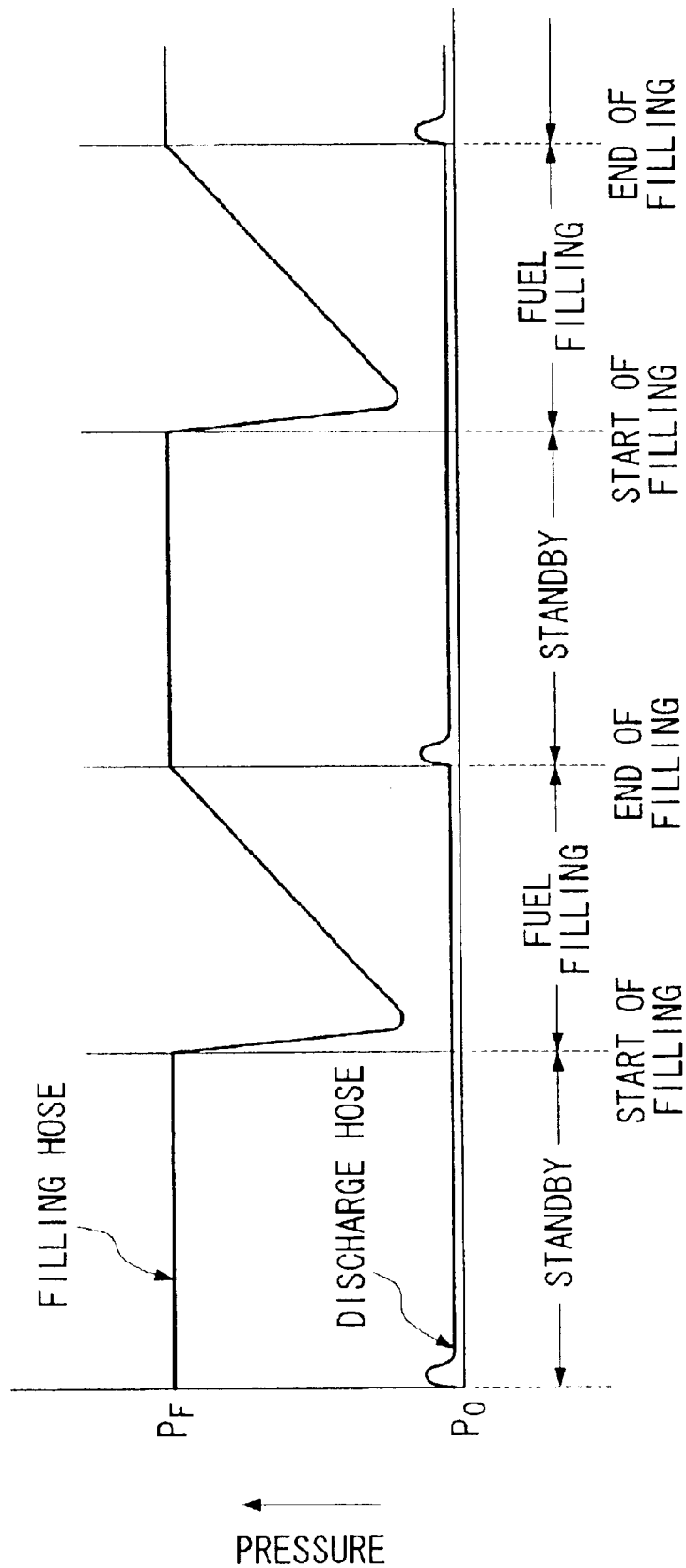
FIG. 6 is a graph showing the changes in pressure within a filling hose and a discharge hose during filling of fuel of the fuel filling device shown in FIG. 5.

FIG. 4 shows a coupling part 20 between fuel distribution line 2 and fuel feed line 11. Coupling part 20 shown here is connected in a state in which connecting member 2a on the side of fuel distribution line 2 and connecting member 11a on the side of fuel feed line 11 are coupled by screwing together with a sealing tape (not shown) in between.

Connecting member 2a preferably employs a constitution in which it is grounded through fuel supply adjusting section 1.

In this coupling part 20, one end and the other end of a wire-shaped conducting member 23 composed of a metal or other conductor are attached to connecting member 2a and connecting member 11a, and as a result, connecting member 2a and connecting member 11a are electrically conductive.

Since fuel feed line 11 is provided with a tubular resin or rubber body, and metal protective wire spiraled around its periphery, it is electrically conductive in the lengthwise direction. Furthermore, since rubber is more flexible than resin, the fuel feed line is preferably made of rubber in consideration of ease of operation.

By coupling fuel distribution line 2 and fuel feed line 11 using conducting member 23, static electricity generated by friction during fuel flow and nozzle connection in parts such as fuel feed line 11 and nozzle 21 can be dissipated through connecting member 11a, conducting member 23, connecting member 2a, and fuel supply adjusting section 1.

For example, in the case static electricity has been generated in automobile W (for example, in the case static electricity has been generated when connecting nozzle 21 to receptacle 71 of automobile W), this static electricity can be dissipated through fuel feed line 11, connecting member 11a, conductive member 23, connecting member 2a, and fuel supply adjusting section 1.

Thus, fuel filling device 10 can be operated safely by preventing accidents involving fires caused by static electricity.

Although the case of connecting two connecting members by means of sealing tape is illustrated in FIG. 4, the present invention is not limited to this, but rather the case in which two connecting members are connected by means of an O-ring is similarly capable of preventing accidents involving fire in advance by dissipating static electricity.

In fuel filling device 10, a fuel leakage detection device 31 is preferably provided that detects fuel leakage within the system.

Fuel leakage detection device 31 detects the pressure of fuel distribution line 2 upstream from flow rate adjusting valve 4 with pressure switch 25, detects the pressure downstream from flow rate adjusting valve 4 with pressure switch 6, and transmits the detection signals from these switches to control section 30.

When the opening of flow rate adjusting valve 4 is made to be constant (flow rate Q), the instantaneous flow rate of the fuel is determined by the pressure difference between the upstream side and downstream side of flow rate adjusting valve 4.

In control section 30, by preliminarily creating a database pertaining to the relationship between instantaneous flow rate and pressure difference, successively reading the pressure differences during filling as calculated from the detected values of pressure switch 25 and pressure switch 6, and then integrating the instantaneous flow rate as calculated from this pressure difference and flow rate (Q), the theoretical filling volume (F0) can be calculated and stored in memory.

On the other hand, in mass flow meter 3, filling volume (F) of fuel actually supplied from fuel source 60 is measured, and this actual filling volume (F) is transmitted to control section 30.

In control section 30, theoretical filling volume (F0) and actual filling volume (F) are compared, their difference in the form of $\Delta F = F0 - F$ is calculated, and that difference is then displayed on display 32 as leakage volume ($\Delta F$).

In fuel leakage detection device 31, fuel leakage is detected by comparing theoretical filling volume (F0) and actual filling volume (F). Namely, the presence or absence of fuel leakage is judged according to the size of difference $\Delta F$ between theoretical filling volume (F0) and actual filling volume (F). For example, fuel leakage can be judged to have occurred when difference $\Delta F$ has exceeded a specified value $\alpha$.

Thus, fuel leakage can be detected both accurately and rapidly.

In addition, in comparison with conventional detection methods in which fuel leakage is detected by fuel sensors provided at locations susceptible to the occurrence of fuel leakage, since the detection method using detection device 31 indicated here detects fuel leakage by comparing theoretical filling volume (F0) and actual filling volume (F), fuel leakage can be detected immediately regardless of the location where fuel leakage occurs.

In addition, by making it such that an alarm sounds when difference ΔF has exceeded (or fallen below) a specified value α, leakage of fuel can be detected immediately.

Moreover, safety can be enhanced by making it such that cutoff valve 5 is activated to interrupt the supply of fuel at this time.

Furthermore, stricter monitoring can be performed by measuring the gas temperature of this data and then correcting the temperature.

This leakage detection method is not limited to fuel filling device 10 for filling fuel into automobile W, but rather can also be applied to all other types of fuel supply, and is capable of ensuring a stable supply of fuel.

EXAMPLES

A packing durability test was conducted in the manner described below. The specimens used in this testing are indicated below.

(1) Rubber Materials
  (a) Materials: acrylonitrile butadiene rubber, hydrogenated acrylonitrile butadiene rubber, ethylene propylene rubber, fluorine rubber, chlorinated butyl
  (b) Shape: dumbbell (JIS K 6251 No. 3) and O-ring (AS568A-116)

(2) Resin Materials
  (a) Materials: polyoxymethylene (polyacetal), nylon (polyamide), polyphenylenesulfide
  (b) Shape: dumbbell (Type ASTM1, thickness: 3 mm)

(3) Resin (Coated) Materials
  (a) Materials: main body; silicone resin, fluororesin, coating; Teflon (registered trademark)
  (b) Shape: O-ring (AS568A-116)

The test method is described below.

After placing the specimen in a container, filling the container with hydrogen gas, and allowing to stand for 1 week at a pressure of 35 MPa, the hydrogen gas was evacuated from the container. When evacuating the hydrogen gas, evacuation was completed in about 30 minutes to that pressure inside the container decreased rapidly.

The dumbbell-shaped specimens were evaluated for appearance, tensile strength, elongation, thickness of parallel parts, width of parallel parts and hardness. O-ring-shaped specimens were evaluated for appearance, thickness and inner diameter.

Testing of tensile strength and elongation was performed in compliance with JIS K 6258.

In this test, in the case of the dumbbell-shaped specimens made of rubber materials, the distance between the bench marks was set at 20 mm, and the pulling speed was set at 500 mm/min. In the case of the dumbbell-shaped specimens made of resin materials, the distance between the bench marks was set at 50 mm, and the pulling speed was 10 mm/min.

Thickness was measured using a dial gauge. Width and inner diameter were measured using a profile projector. Hardness was measured using a Wallace hardness gauge.

In each of the above evaluation tests, three specimens were used in testing to represent a single sample. In addition, the amount of change and change ratio before and after testing were calculated for each item from the measured values before testing and the measured values after testing. The test results are shown in Tables 1 through 5.

TABLE 1

| | | | | | Tensile Strength | | | Elongation | | |
|---|---|---|---|---|---|---|---|---|---|---|
| Specimen | Material | Type | Shape | Appearance | Before test (MPa) | After test (MPa) | Change ratio (%) | Before test (%) | After test (%) | Change ratio (%) |
| 1 | NBR | Rubber | Dumbbell | — | 20.4 | 19.6 | −4 | 365 | 349 | −4 |
| 2 | | | | | 20.7 | 18.8 | −9 | 378 | 321 | −15 |
| 3 | | | | | 20.1 | 19.6 | −2 | 358 | 355 | −1 |
| 4 | NBR | Rubber | Dumbbell | — | 17.5 | 18.1 | 4 | 168 | 170 | 1 |
| 5 | | | | | 21.7 | 16.2 | −25 | 213 | 152 | −29 |
| 6 | | | | | 18.8 | 18.5 | −1 | 168 | 178 | 6 |
| 7 | HNBR | Rubber | Dumbbell | Matte | 20.3 | 17.4 | −14 | 166 | 149 | −10 |
| 8 | | | | | 19.5 | 18.8 | −4 | 154 | 147 | −5 |
| 9 | | | | | 19.9 | 19.9 | 0 | 150 | 156 | 4 |
| 10 | HNBR | Rubber | Dumbbell | Coarse, highly foamed | 22.1 | 12.5 | −43 | 143 | 82 | −43 |
| 11 | | | | | 21.3 | 18.2 | −15 | 140 | 115 | −18 |
| 12 | | | | | 22.8 | 20.6 | −10 | 149 | 138 | −7 |
| 13 | EPR | Rubber | Dumbbell | — | 19.1 | 18.5 | −3 | 238 | 231 | −3 |
| 14 | | | | | 17.4 | 17.9 | 3 | 228 | 223 | −2 |
| 15 | | | | | 19.6 | 17.3 | −12 | 238 | 217 | −9 |
| 16 | EPR | Rubber | Dumbbell | Partly foamed | 15.8 | 14.8 | −6 | 143 | 135 | −6 |
| 17 | | | | | 15.6 | 14.1 | −10 | 153 | 130 | −15 |
| 18 | | | | | 15.5 | 14.9 | −4 | 143 | 135 | −6 |
| 19 | FKM | Rubber | Dumbbell | — | 16.0 | 12.5 | −22 | 320 | 220 | −31 |
| 20 | | | | | 13.8 | 15.0 | 8 | 284 | 498 | 76 |
| 21 | | | | | 14.8 | 15.6 | 5 | 289 | 316 | 9 |
| 22 | FKM | Rubber | Dumbbell | Partly matte | 15.1 | 14.7 | −2 | 262 | 268 | 2 |
| 23 | | | | | 15.2 | 13.8 | −9 | 280 | 315 | 13 |
| 24 | | | | | 15.0 | 14.8 | −2 | 265 | 266 | 0 |
| 25 | FKM | Rubber | Dumbbell | — | 17.5 | 14.9 | −15 | 212 | 179 | −16 |
| 26 | | | | | 16.4 | 14.9 | −9 | 183 | 170 | −7 |
| 27 | | | | | 16.2 | 14.9 | −8 | 199 | 177 | −11 |
| 28 | BC | Rubber | Dumbbell | — | 16.3 | 11.9 | −27 | 232 | 222 | −4 |

TABLE 1-continued

| | | | | | Tensile Strength | | | Elongation | | |
|---|---|---|---|---|---|---|---|---|---|---|
| Specimen | Material | Type | Shape | Appearance | Before test (MPa) | After test (MPa) | Change ratio (%) | Before test (%) | After test (%) | Change ratio (%) |
| 29 | | | | | 15.8 | 13.2 | −16 | 227 | 180 | −21 |
| 30 | | | | | 16.3 | 11.1 | −32 | 230 | 168 | −27 |

NBR: Acrylonitrile butadiene rubber
HNBR: Hydrogenated acrylonitrile butadiene rubber
EPR: Ethylene propylene rubber
FKM: Fluorine rubber
BC: Chlorinated butyl
Rubber: Rubber material

TABLE 2

| | | | | Thickness | | | Width | | | Hardness | | |
|---|---|---|---|---|---|---|---|---|---|---|---|---|
| Specimen | Material | Type | Shape | Before test (mm) | After test (mm) | Change ratio (%) | Before test (mm) | After test (mm) | Change ratio (%) | Before test (−) | After test (−) | Change ratio (−) |
| 1 | NBR | Rubber | Dumbbell | 2.205 | 2.253 | 2 | 5.070 | 5.104 | 1 | 68.0 | 69.0 | 1 |
| 2 | | | | 2.250 | 2.303 | 2 | 5.015 | 5.020 | 0 | 69.0 | 70.0 | 1 |
| 3 | | | | 2.172 | 2.213 | 2 | 5.060 | 5.065 | 0 | 68.5 | 69.0 | 0.5 |
| 4 | NBR | Rubber | Dumbbell | 2.170 | 2.307 | 6 | 5.054 | 5.196 | 3 | 84.0 | 86.0 | 2 |
| 5 | | | | 2.200 | 2.333 | 6 | 5.052 | 5.190 | 3 | 83.5 | 84.0 | 0.5 |
| 6 | | | | 2.190 | 2.323 | 6 | 5.054 | 5.208 | 3 | 84.0 | 86.0 | 2 |
| 7 | HNBR | Rubber | Dumbbell | 2.530 | 2.480 | −2 | 5.043 | 5.046 | 0 | 73.0 | 74.0 | 1 |
| 8 | | | | 2.510 | 2.517 | 0 | 5.055 | 5.006 | −1 | 73.0 | 75.0 | 2 |
| 9 | | | | 2.470 | 2.543 | 3 | 5.051 | 5.121 | 1 | 73.0 | 74.0 | 1 |
| 10 | HNBR | Rubber | Dumbbell | 2.230 | 2.217 | −1 | 5.042 | 5.068 | 1 | 83.5 | 87.0 | 3.5 |
| 11 | | | | 2.180 | 2.180 | 0 | 5.047 | 4.999 | −1 | 84.0 | 86.0 | 2 |
| 12 | | | | 2.350 | 2.345 | 0 | 5.044 | 5.104 | 1 | 85.0 | 87.0 | 2 |
| 13 | EPR | Rubber | Dumbbell | 2.340 | 2.333 | 0 | 5.054 | 5.074 | 0 | 72.0 | 73.0 | 1 |
| 14 | | | | 2.213 | 2.210 | 0 | 5.051 | 5.119 | 1 | 71.0 | 74.0 | 3 |
| 15 | | | | 2.345 | 2.347 | 0 | 5.059 | 5.087 | 1 | 70.5 | 74.0 | 3.5 |
| 16 | EPR | Rubber | Dumbbell | 2.062 | 2.063 | 0 | 5.039 | 5.022 | 0 | 72.0 | 87.0 | 15 |
| 17 | | | | 2.072 | 2.070 | 0 | 5.037 | 5.044 | 0 | 74.5 | 86.0 | 11.5 |
| 18 | | | | 2.100 | 2.103 | 0 | 5.045 | 5.085 | 1 | 78.0 | 86.0 | 8 |
| 19 | FKM | Rubber | Dumbbell | 2.105 | 2.170 | 3 | 5.051 | 5.119 | 1 | 66.0 | 67.0 | 1 |
| 20 | | | | 2.062 | 2.130 | 3 | 5.066 | 5.137 | 1 | 66.0 | 68.0 | 2 |
| 21 | | | | 2.060 | 2.137 | 4 | 5.073 | 5.182 | 2 | 66.0 | 68.0 | 2 |
| 22 | FKM | Rubber | Dumbbell | 2.075 | 2.140 | 3 | 5.067 | 5.142 | 1 | 84.0 | 86.0 | 2 |
| 23 | | | | 2.160 | 2.227 | 3 | 5.061 | 5.151 | 2 | 84.5 | 86.0 | 1.5 |
| 24 | | | | 2.100 | 2.170 | 3 | 5.065 | 5.142 | 2 | 84.5 | 84.0 | −0.5 |
| 25 | FKM | Rubber | Dumbbell | 2.410 | 2.487 | 3 | 5.135 | 5.195 | 1 | 79.5 | 81.0 | 1.5 |
| 26 | | | | 2.390 | 2.493 | 4 | 5.081 | 5.194 | 2 | 81.0 | 82.0 | 1 |
| 27 | | | | 2.420 | 2.497 | 3 | 5.139 | 5.116 | 0 | 81.0 | 83.0 | 2 |
| 28 | BC | Rubber | Dumbbell | 2.350 | 2.643 | 12 | 5.173 | 5.650 | 9 | 66.5 | 62.0 | −4.5 |
| 29 | | | | 1.880 | 2.087 | 11 | 5.189 | 5.507 | 6 | 66.0 | 63.0 | −3 |
| 30 | | | | 2.040 | 2.287 | 12 | 5.166 | 5.756 | 11 | 66.0 | 62.0 | −4 |

NBR: Acrylonitrile butadiene rubber
HNBR: Hydrogenated acrylonitrile butadiene rubber
EPR: Ethylene propylene rubber
FKM: Fluorine rubber
BC: Chlorinated butyl
Rubber: Rubber material

TABLE 3

| | | | | | Thickness | | | Inner Diameter | | |
|---|---|---|---|---|---|---|---|---|---|---|
| Specimen | Material | Type | Shape | Appearance | Before test (mm) | After test (mm) | Change ratio (%) | Before test (mm) | After test (mm) | Change ratio (%) |
| 31 | NBR | Rubber | O-ring | — | 2.605 | 2.600 | −0.19 | 18.799 | 18.791 | −0.05 |
| 32 | | | | | 2.613 | 2.610 | −0.11 | 18.753 | 18.747 | −0.03 |
| 33 | | | | | 2.602 | 2.595 | −0.25 | 18.730 | 18.698 | −0.17 |
| 34 | NBR | Rubber | O-ring | — | 2.665 | 2.695 | 1.13 | 18.750 | 18.819 | 0.37 |
| 35 | | | | | 2.647 | 2.675 | 1.06 | 18.780 | 18.835 | 0.29 |

TABLE 3-continued

| | | | | | Thickness | | | Inner Diameter | | |
|---|---|---|---|---|---|---|---|---|---|---|
| Specimen | Material | Type | Shape | Appearance | Before test (mm) | After test (mm) | Change ratio (%) | Before test (mm) | After test (mm) | Change ratio (%) |
| 36 | | | | | 2.655 | 2.685 | 1.15 | 18.727 | 18.784 | 0.31 |
| 37 | HNBR | Rubber | O-ring | — | 2.640 | 2.635 | −0.19 | 18.703 | 18.659 | −0.24 |
| 38 | | | | | 2.628 | 2.620 | −0.30 | 18.697 | 18.649 | −0.25 |
| 39 | | | | | 2.617 | 2.615 | −0.08 | 18.733 | 18.729 | −0.02 |
| 40 | HNBR | Rubber | O-ring | — | 2.626 | 2.615 | −0.42 | 18.738 | 18.706 | −0.17 |
| 41 | | | | | 2.631 | 2.635 | 0.15 | 18.725 | 18.694 | −0.17 |
| 42 | | | | | 2.629 | 2.640 | 0.42 | 18.695 | 18.689 | −0.03 |
| 43 | EPR | Rubber | O-ring | — | 2.629 | 2.630 | 0.04 | 18.711 | 18.692 | −0.10 |
| 44 | | | | | 2.634 | 2.635 | 0.04 | 18.763 | 18.760 | −0.02 |
| 45 | | | | | 2.644 | 2.645 | 0.06 | 18.639 | 18.626 | −0.07 |
| 46 | EPR | Rubber | O-ring | — | 2.642 | 2.635 | −0.25 | 18.718 | 18.707 | −0.06 |
| 47 | | | | | 2.657 | 2.645 | −0.43 | 18.672 | 18.650 | −0.12 |
| 48 | | | | | 2.626 | 2.625 | −0.02 | 18.712 | 18.865 | 0.81 |

NBR: Acrylonitrile butadiene rubber
HNBR: Hydrogenated acrylonitrile butadiene rubber
EPR: Ethylene propylene rubber
Rubber: Rubber material

TABLE 4

| | | | | | Thickness | | | Inner Diameter | | |
|---|---|---|---|---|---|---|---|---|---|---|
| Specimen | Material | Type | Shape | Appearance | Before test (mm) | After test (mm) | Change ratio (%) | Before test (mm) | After test (mm) | Change ratio (%) |
| 49 | FKM | Rubber | O-ring | — | 2.605 | 2.595 | −0.38 | 18.533 | 18.505 | −0.15 |
| 50 | | | | | 2.616 | 2.610 | −0.23 | 18.465 | 18.455 | −0.06 |
| 51 | | | | | 2.618 | 2.615 | −0.10 | 18.513 | 18.479 | −0.18 |
| 52 | FKM | Rubber | O-ring | — | 2.643 | 2.650 | 0.28 | 18.614 | 18.696 | 0.44 |
| 53 | | | | | 2.633 | 2.660 | 1.04 | 18.629 | 18.677 | 0.26 |
| 54 | | | | | 2.634 | 2.645 | 0.42 | 18.581 | 18.633 | 0.28 |
| 55 | FKM | Rubber | O-ring | — | 2.542 | 2.545 | 0.14 | 18.467 | 18.524 | 0.31 |
| 56 | | | | | 2.542 | 2.555 | 0.51 | 18.503 | 18.556 | 0.29 |
| 57 | | | | | 2.541 | 2.560 | 0.77 | 18.470 | 18.481 | 0.06 |
| 58 | BC | Rubber | O-ring | Coarse, | 2.573 | 2.650 | 3.01 | 18.696 | 19.157 | 2.47 |
| 59 | | | | highly | 2.582 | 2.650 | 2.63 | 18.700 | 19.169 | 2.51 |
| 60 | | | | foamed | 2.574 | 2.635 | 2.39 | 18.664 | 19.044 | 2.03 |
| 61 | *1 | Coated | O-ring | Broken | 3.645 | 3.640 | −0.12 | — | — | — |
| 62 | | | | | 3.614 | 3.580 | −0.93 | — | — | — |
| 63 | | | | | 3.573 | 3.565 | −0.21 | — | — | — |
| 64 | *2 | Coated | O-ring | Broken | 3.619 | 3.665 | 1.27 | — | — | — |
| 65 | | | | | 3.591 | 3.600 | 0.25 | — | — | — |
| 66 | | | | | 3.697 | 3.750 | 1.43 | — | — | — |
| 67 | | | | | 3.654 | 3.720 | 1.81 | — | — | — |

FKM: Fluorine rubber
BC: Chlorinated butyl
*1: Silicone resin coated with Teflon
*2: Fluororesin coated with Teflon
Rubber: Rubber material
Coated: Resin (coated) material

TABLE 5

| | | | | | Tensile Strength | | | Elongation | | | Thickness | | | Width | | |
|---|---|---|---|---|---|---|---|---|---|---|---|---|---|---|---|---|
| Specimen | Material | Type | Shape | Appearance | Before test (MPa) | After test (MPa) | Change ratio (%) | Before test (%) | After test (%) | Change ratio (%) | Before test (mm) | After test (mm) | Change ratio (%) | Before test (mm) | After test (mm) | Change ratio (%) |
| 68 | POM | Resin | Dumb-bell | — | 59.5 | 56.8 | −5 | 42 | 94 | 124 | 3.165 | 3.343 | 6 | 12.732 | 12.697 | 0 |
| 69 | | | | | 59.5 | 56.9 | −5 | 61 | 110 | 81 | 3.165 | 3.177 | 0 | 12.727 | 12.771 | 0 |
| 70 | | | | | 60.2 | 57.3 | −5 | 61 | 94 | 55 | 3.165 | 3.240 | 2 | 12.732 | 12.724 | 0 |
| 71 | PA | Resin | Dumb-bell | — | 103.2 | 88.0 | −15 | — | — | — | 4.005 | 3.973 | −1 | 9.929 | 9.881 | 0 |
| 72 | | | | | 96.1 | 88.2 | −8 | — | — | — | 4.000 | 3.980 | 0 | 9.951 | 9.942 | 0 |
| 73 | | | | | 97.6 | 85.6 | −12 | — | — | — | 4.005 | 3.977 | −1 | 9.942 | 9.919 | 0 |
| 74 | PA | Resin | Dumb-bell | — | 210.7 | 212.4 | 1 | — | — | — | 3.915 | 4.023 | 3 | 10.013 | 9.961 | −1 |
| 75 | | | | | 220.3 | 190.1 | −14 | — | — | — | 3.907 | 4.013 | 3 | 9.980 | 9.978 | 0 |

TABLE 5-continued

| | | | | | Tensile Strength | | | Elongation | | | Thickness | | | Width | | |
|---|---|---|---|---|---|---|---|---|---|---|---|---|---|---|---|---|
| Spec-imen | Mate-rial | Type | Shape | Appear-ance | Before test (MPa) | After test (MPa) | Change ratio (%) | Before test (%) | After test (%) | Change ratio (%) | Before test (mm) | After test (mm) | Change ratio (%) | Before test (mm) | After test (mm) | Change ratio (%) |
| 76 | | | | | 227.0 | 203.2 | −10 | — | — | — | 3.915 | 4.027 | 3 | 9.994 | 9.985 | 0 |
| 77 | PPS | Resin | Dumb-bell | Partly foamed | 77.5 | 75.3 | −3 | −4 | 7 | −292 | 3.108 | 3.140 | 1 | 12.625 | 12.680 | 0 |
| 78 | | | | | 79.4 | 76.3 | −4 | 3 | 7 | 181 | 3.110 | 3.127 | 1 | 12.552 | 12.653 | 1 |
| 79 | | | | | 78.6 | 73.3 | −7 | 1 | 7 | 822 | 3.100 | 3.157 | 2 | 12.620 | 12.590 | 0 |

POM: Polyoxymethylene (polyacetal)
PA: Polyamide
PPS: Polyphenylenesulfide
Resin: Resin material Each specimen was evaluated according to the following standards based on the test shown in Tables 1 through 5.
(a) Appearance: Absence of abnormalities such as foaming and breaking
(b) Tensile strength: Absence of significant decrease with respect to product specifications
(c) Elongation: Absence of significant decrease with respect to product specifications
(d) Thickness: Absence of significant change with respect to dimensions before testing
(e) Width or inner diameter: Absence of significant change with respect to dimensions before testing
(f) Hardness: Absence of significant hardening or softening with respect to product specifications The following conclusions can be drawn from the above test results.
(1) Acrylonitrile butadiene rubber, hydrogenated acrylonitrile butadiene rubber, ethylene propylene rubber, fluorine rubber, polyoxymethylene (polyacetal), and nylon (polyamide) exhibit small changes in mechanical properties (tensile strength, elongation and hardness) and dimensions, and their change in appearance is also comparatively small.
(2) Acrylonitrile butadiene rubber, ethylene propylene rubber, and nylon (polyamide) in particular exhibit small changes in mechanical properties and dimensions, and their change in appearance is also small.
(3) In the case of using acrylonitrile butadiene rubber, specimens 1 through 3, which had a hardness of 75 or less before testing, exhibited small changes in mechanical properties as compared with specimens 4 through 6, which had a hardness greater than 75.
(4) In the case of using ethylene propylene rubber, specimens 13 through 15, which had a hardness of 72 or less before testing, exhibited small changes in both mechanical properties and appearance as compared with specimens having a hardness greater than 72.
(5) Breakage of the coating occurred in the case of using resin (coated) materials.
(6) Chlorinated butyl exhibited significant decreases in tensile strength, elongation and thickness. In addition, foaming was observed in O-ring-shaped specimens.
(7) Polyphenylenesulfide exhibited a large decrease in tensile strength.

Furthermore, these conclusions were not obtained from a specific test, but rather are based on judgments obtained based on a comprehensive evaluation of each of the above test results. In addition, the elongation test of polyamide resin was omitted from Table 5 since the reliability of the measured values was low.

What is claimed is:

1. A fuel filling device which fills hydrogen gas or compressed natural gas into a fuel tank of a vehicle as fuel, comprising:
   a fuel supply adjusting section which adjusts an amount of the fuel supplied;
   a fuel feed line which feeds the fuel from the fuel supply adjusting section to the vehicle;
   a nozzle to be removably coupled to the vehicle which supplies the fuel from the fuel feed line to the vehicle;
   a fuel distribution line provided in the fuel supply adjusting section, to guide the fuel to the fuel feed line;
   a discharge device connected directly to the fuel distribution line, and located within the fuel distribution line, said discharge device discharging the fuel within the fuel feed line to the outside;
   a first cutoff valve provided in the fuel distribution line;
   a second cutoff valve provided in the discharge device; and
   a control section which closes the first cutoff valve and opens the second cutoff valve following completion of filling of the fuel, thereby discharging the fuel within the fuel feed line to the outside.

2. A fuel filling device according to claim 1, further comprising a packing for at least one of the fuel supply adjusting section, fuel feed line, or nozzle composed of one or more materials selected from the group consisting of acrylonitrile butadiene rubber, hydrogenated acrylonitrile butadiene rubber, ethylene propylene rubber, fluorine rubber, polyacetal, and polyamide.

3. A fuel filling device according to claim 1, further comprising a packing for at least one of the fuel supply adjusting section, fuel feed line, or nozzle composed of one or more materials selected from the group consisting of acrylonitrile butadiene rubber, ethylene propylene rubber, and polyamide.

4. A fuel filling device according to claim 1, wherein the fuel feed line and fuel supply adjusting section are coupled with an electrically conductive member, and the fuel supply adjusting section is grounded.

5. A fuel filling device according to claim 1, further comprising:
   a flow meter which measures a flow rate of the fuel and a flow rate adjusting valve which adjusts a flow rate of the fuel provided in the fuel distribution line, to enable a theoretical filling volume, which is calculated based on the flow rate of the fuel calculated from an opening of the flow rate adjusting valve and a pressure difference between an upstream pressure and a downstream pressure of the flow rate adjusting valve, to be compared with an actual filling volume detected with the flow meter.

6. A fuel filling device according to claim 1, further comprising a check valve provided in the fuel discharge line, which prevents an inflow of air into the fuel feed line.

7. A fuel filling device according to claim 1, further comprising a fuel leakage detection device provided in the fuel supply adjusting section, which detects the fuel leakage of a fuel filling device.

8. A fuel filling device according to claim 1, wherein the fuel feed line is formed as one pipeline.

9. A fuel filling device according to claim 1, further comprising:

a plurality of storage tanks provided in the fuel supply adjusting section, in which fuel is filled at mutually different pressures;

a line which connects the plurality of storage tanks and the fuel distribution line; and pressure switches provided in the fuel distribution line and the line which connects the plurality of storage tanks and the fuel distribution line, wherein a storage tank which is used for filling of the fuel is switched to another storage tank having the next highest filling pressure when the pressure difference between pressures detected by the pressure switch provided in the fuel distribution line and the pressure switch provided in the line becomes small.

* * * * *